United States Patent
Bortolini et al.

(10) Patent No.: US 7,013,000 B2
(45) Date of Patent: Mar. 14, 2006

(54) MTA INTERCOM FEATURE

(75) Inventors: Edward J. Bortolini, Nederland, CO (US); Roger W. Loots, Broomfield, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 818 days.

(21) Appl. No.: 09/797,337

(22) Filed: Mar. 1, 2001

(65) Prior Publication Data

US 2002/0124267 A1    Sep. 5, 2002

(51) Int. Cl.
*H04M 11/00* (2006.01)
*H04M 1/00* (2006.01)
*H04M 9/00* (2006.01)

(52) U.S. Cl. ............................. 379/93.05; 379/93.06; 379/167.13; 379/167.01; 379/159

(58) Field of Classification Search ............ 379/164, 379/165, 171, 159, 160, 161, 167.01, 202.01, 379/93.09, 93.05, 167.04, 167.12, 93.06, 379/93.07, 93.14, 167.13, 167.05
See application file for complete search history.

(56) References Cited

U.S. PATENT DOCUMENTS

| | | | | |
|---|---|---|---|---|
| 5,530,951 A * | 6/1996 | Argintar | ................ | 379/67.1 |
| 5,784,448 A * | 7/1998 | Yaker | ................ | 379/215.01 |
| 5,881,143 A * | 3/1999 | Johnson | ................ | 379/177 |
| 5,887,054 A * | 3/1999 | Burke et al. | ................ | 379/159 |
| 6,628,768 B1 * | 9/2003 | Ramaswamy et al. | . | 379/202.01 |
| 6,714,534 B1 * | 3/2004 | Gerszberg et al. | ................ | 370/352 |
| 6,766,004 B1 * | 7/2004 | Chiloyan | ................ | 379/142.15 |
| 2002/0037004 A1 * | 3/2002 | Bossemeyer et al. | ................ | 370/356 |

\* cited by examiner

*Primary Examiner*—Rexford Barnie

(57) ABSTRACT

The present invention provides a media terminal adaptor having an internal logical interface to permit communication connections to be established between ports of the MTA.

22 Claims, 5 Drawing Sheets

MTA INTERCOM FEATURE

FIELD OF THE INVENTION

The present invention relates generally to media devices and specifically to media terminal adaptors.

BACKGROUND OF THE INVENTION

The provision of multimedia services to the home is a rapidly growing industry. Interactive television networks are currently under development that provide an array of services to the home, such as IP access, interactive cable television programing, data storage, and the like.

Service architectures for these networks typically include the components of FIG. 1. Referring to FIG. 1, the service network typically includes a head end 10 (containing a cable modem termination system (or gateway) and other telephony equipment) connected via a communications line 14 to a distribution ring 18. As will be appreciated, a "head end" refers to the cable facilities that provide a broadcast stream to a customer's set-top box and television. The distribution ring 18 includes a plurality of distribution hubs 22a–d, each of which is connected to a plurality of fiber nodes 26a,b and amplifier(s) 30a–d, and to one or more subscriber residences 34a–d. The various communication lines 14, 38, 42 can be implemented as coaxial cables, optical fibers, wireless signals, and the like.

FIG. 2 depicts the service distribution architecture at the subscriber's residence. A network interface unit (NIU) or network interface device (NID) 50, which is located at the residence 34, is connected to incoming communication line 42 and includes a set-top box unit 54 connected to television 58, a modem unit 62 connected to personal computer 66, and telephony device or stand alone media terminal adaptor ("MTA") 70 connected to one or more telephones 74. Alternatively, the MTA can be an embedded MTA which would include both the modem unit and the telephony components. Alternatively, the NIU or NID can be replaced by a splitter providing separate lines, one of which is connected to a set-top box and the other of which is connected to an embedded MTA or to a stand alone MTA and separate modem.

The telephone(s) 74 access the headend 10 and ultimately the public switching telephone network (PSTN) or a data network via the MTA 70. Problems arise when a subscriber wishes to contact another subscriber served by the same MTA 70. For example, a single MTA 70 typically services a multifamily dwelling such as an apartment building. The subscriber must first access the headend 10 and PSTN before the call can be routed to the other subscriber. Thus, the subscriber is charged unnecessarily for the telephone call. It would be desirable to modify the functionality of the MTA to permit direct contact between the subscribers by a communication path that excludes the headend 10 and PSTN.

SUMMARY OF THE INVENTION

The MTA of the present invention provides internal switching or routing of contacts from a communication device attached to one MTA port to a communication device attached to another MTA port. As used herein, a media terminal adaptor or MTA refers to the equipment at the subscriber's home that provides the telephony functionality to the subscriber. The switching or routing can be performed within the MTA and independently of telecommunication components located external to the MTA, such as components in the headend, the PSTN, and/or any other communications or data networks accessible from the headend. In one configuration, the MTA has both physical and logical terminations of connections.

In a first embodiment of the present invention, a telecommunications system is provided that includes a media terminal adaptor including the following components:

(a) a digital signal processor;

(b) a memory accessed by the digital signal processor;

(c) a plurality of ports for connecting to a plurality of communication devices;

(d) a digital coding device for encoding and decoding digital signals; and (e) a switch, connected to the plurality of ports, for connecting one port with another port. The MTA permits a first communication device attached to a first MTA port to be connected to a second communication device attached to a second MTA port.

The switch can be any suitable analog or digital switching device, with time switches and space switches or combinations thereof (e.g., space-time-space (STS) switches, time-space-time (TST) switches, etc.) being preferred.

The telecommunications system can include other components. In one configuration, the media terminal adaptor is connected to a headend of a telecommunications system. In one configuration, the media terminal adaptor is part of a network interface unit or network interface device. In one configuration, the media terminal device includes a modem that is connected to a cable modem termination system in the headend.

The media terminal device is connected to other telecommunications components by communication lines that can be implemented as wireless, wired, optical, or coaxial connections. In one configuration, the input/output communication line that connects directly to the MTA from a corresponding fiber node is a coaxial cable.

The MTA can include more than one digital signal processor and/or more than one memory. In one configuration, the media terminal adaptor includes a second digital signal processor, with the digital signal processor and second digital signal processor accessing at least a portion of the same (common or shared) memory.

The MTA of the present invention provides significantly enhanced functionality compared to conventional MTA's. The MTA of the present invention can provide an in-home intercom functionality for households or act as a private branch exchange or PBX for multiple dwelling units or small businesses. This is realized by the use of a logical interface (in the MTA) that is able to perform switching functionality internal to the MTA. By utilizing software to recognize special dial instructions (e.g., digit sequence or pattern), the processor can cause direct connection between the lines internal to the MTA to provide the intercom or small PBX function. In the case of multiple communication devices being on the same physical line, known multi-party operations could be utilized for the intercom function. The use of a logical interface internal to the MTA to provide the necessary connectivity enables the connection of the first and second ports to be made independent (without using) the communications line(s) or network components located outside of the dwelling or multiple dwelling unit (or MTA). As a result, the user is not being charged by service providers for the use of network components located external to the MTA. The MTA is readily scalable to any number of communications devices/users by adding more ports and/or switches.

In another embodiment, a method for operating a media terminal adaptor is provided. The method includes the steps of:

(a) providing a media terminal adaptor including (i) a digital signal processor; (ii) a memory accessed by the digital signal processor; (iii) a plurality of ports for connecting to a plurality of communication devices; and (iv) a switch, wherein the media terminal adaptor is connected to a headend of telecommunications system;

(b) receiving a command from a user via a first communication device connected to a first port, the command requesting connection to a second port (and/or a number of other ports) connected to one or more other communication devices, the first port and the second port (and/or other ports) being in the same media terminal adaptor; and (c) transmitting a signal to the second port (and/or a number of other ports) in response to the command.

The command is typically generated after a unique symbol or series of symbols is received. For example, the symbols can be digits acquired from tones emitted from the communications device. In one configuration, the transmitting step includes comparing at least a portion of the command to a routing table to determine whether the communications device is to be connected to an external network component or to another port of the MTA.

The user can contact a second user connected via a communication device attached to the second port. In response to the signal one or more of the communication devices attached to the second port (and/or other ports) rings. In response, the first port is typically connected to the second port when the second user enables a communication device attached to the second port (e.g., when the user places a telephone off-hook).

A number of unique ringing patterns can be used. For example, the ring can have a unique pattern indicating the identity of a first user, the identity of the second user, or the location of a communications device attached to the first port.

The switching can be performed using time slots, space slots, and combinations thereof. In one switching mode, the method includes the further steps of:

writing information received from the second port to the memory;

reading the written information from the memory; and providing the information to the first port. The writing and reading steps can be performed by different digital signal processors.

The user can be a person or a network component. For example, the first user, in one configuration, is a web browser. The web browser can forward the command signal in response to the occurrence of a predetermined event, such as a stock attaining a selected price.

In yet another embodiment, a media terminal adaptor is provided that includes:

(a) a digital signal processor;

(b) a memory accessed by the digital signal processor;

(c) a plurality of ports for connecting to a plurality of communication devices;

(d) a digital coding device for encoding and decoding digital signals;

(e) receiving means (e.g., a digit collection device), for receiving a command from a user via a first communication device connected to a first port, the command requesting connection to a second port connected to a second communication device, the first and second ports being in the same media terminal adaptor; and (f) connecting means (e.g., a switch, router, bridge, or director) for connecting the first port to the second port, whereby the user may contact a second user connected via the second communication device to the second port.

DETAILED DESCRIPTION

Figure 1:
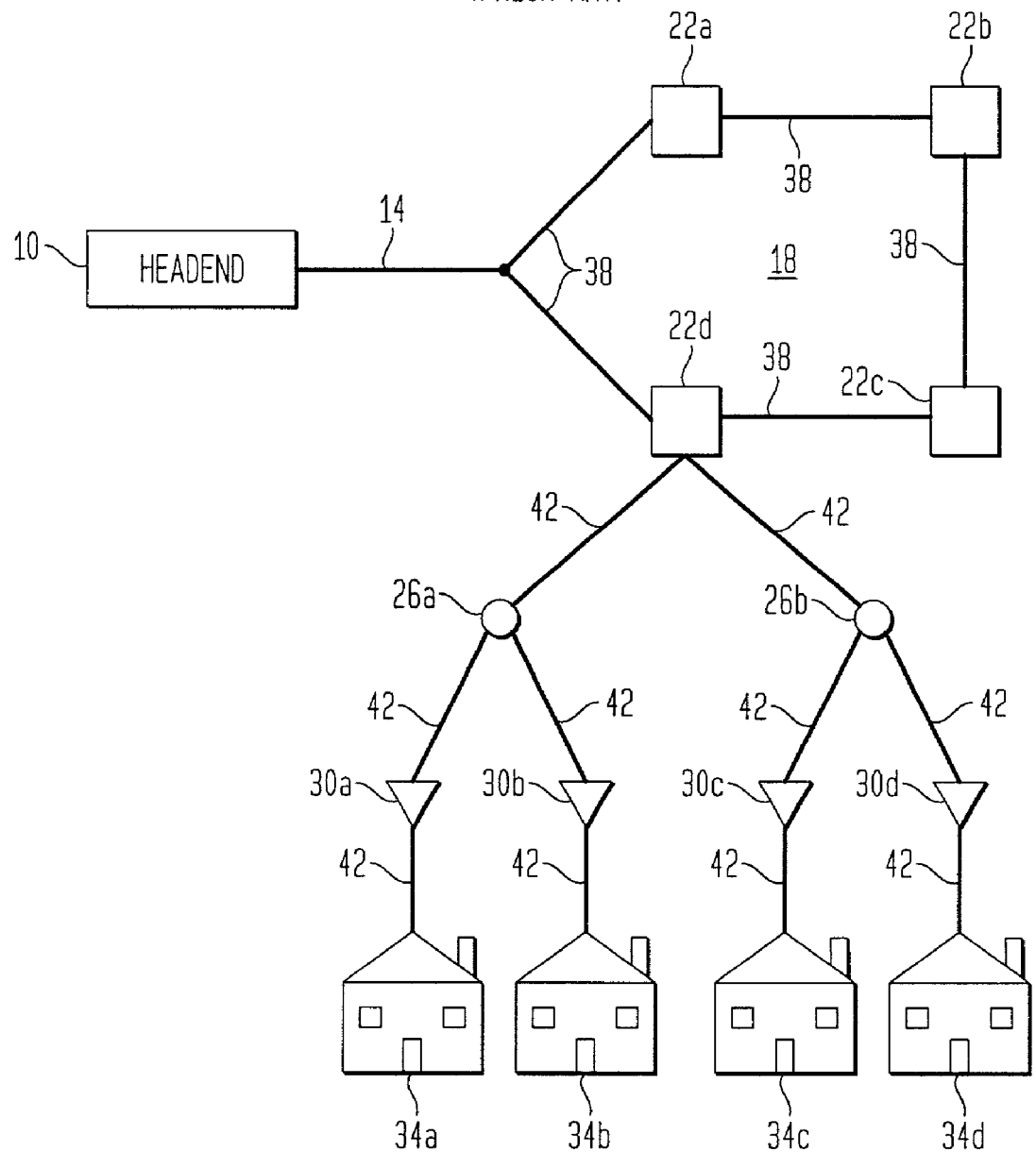
FIG. 1 depicts a prior art telecommunications architecture for distributing services to a plurality of subscribers.
Figure 2:
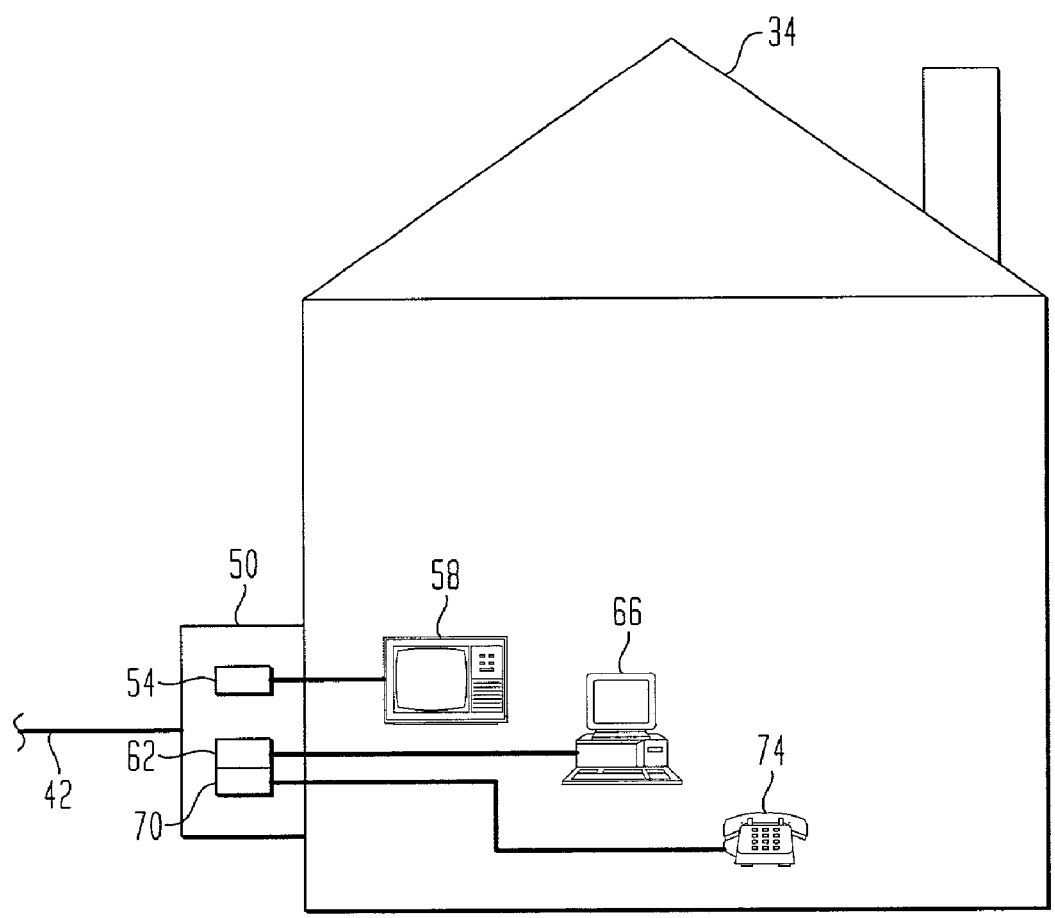
FIG. 2 depicts a prior art telecommunications architecture for distributing services to a dwelling.
Figure 3:
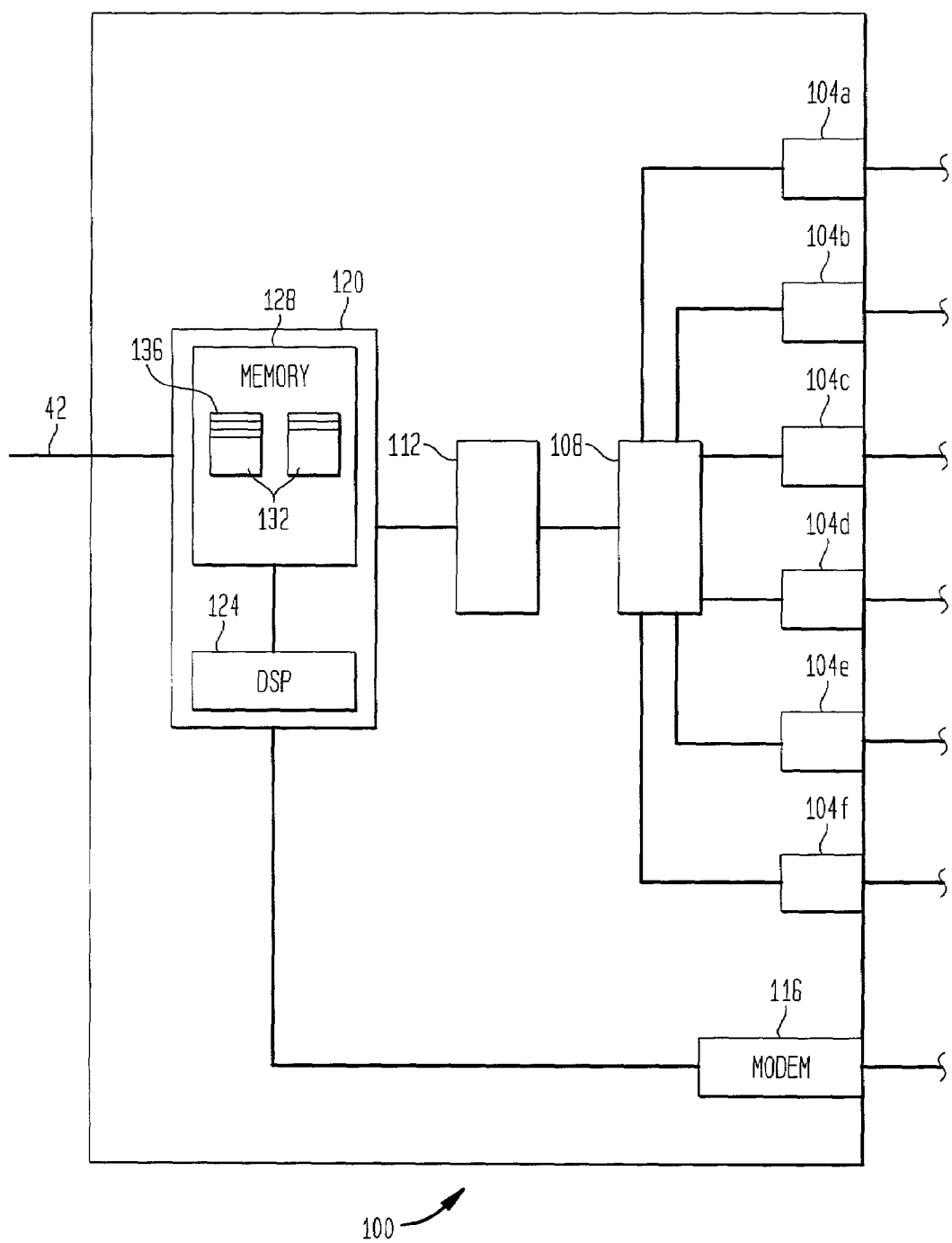
FIG. 3 depicts a first embodiment of an embedded MTA.

Referring to FIG. 3, a first embodiment of an MTA device 100 is depicted. The MTA device 100 includes a plurality of telephony ports 104a–f (e.g., RJ11 ports) for connecting to telephones or other analog or digital communication devices (not shown), a switch 108 connected to the ports 104a–f for connecting one port to a second different port, a digital encoder/decoder or Codec 112 connected to the switch 108 for placing signals in the correct format, a modem 116, and a processing architecture 120 for managing incoming/outgoing data. The processing architecture 120 includes a digital signal processor 124 and memory 128. The memory contains one or more queues 132 containing one or more items 136. Each item is incoming or outgoing digital information or data.

The switch 108 can be any conventional logical, electrical, mechanical, etc. telephony switching device (e.g., space switch, time switch, space-time switch, time-space switch, time-space-time (TST) switch, space-time-space (STS) switch, and any other combination of T and S such as TSSSST, SSTSS, TSTS, switches, etc.). Examples of such switches include the DMS-100 family of switches produced by Northern Telecom, the 5ESS family of switches produced by Lucent Technologies, Inc., and the various switches produced by Lucent Technologies, Inc. A particularly preferred switching device is a 64 kb DS0-type switch.

The various protocols used to transmit information to and from the headend 10 to the modem 116 and digital signal processor 124 are well known. The protocols are generally suitable for a coaxial or fiber optic cable. For example, suitable protocols include DOCSIS and Aloha and updates, and modifications thereof.

As will be appreciated, these protocols are different from protocols typically used by a Private Branch Exchange or PBX. PBX's are connected to a trunk which typically has a shielded or unshielded twisted wire configuration. The T-1 circuit (and their sub-rate DS0 circuit) in the PBX permits multiple voice conversations to be placed on the trunk. The physical T1 port in the PBX is a DS1 channel as defined under the DSX-1 standard.

The (space) switch 108 includes a cross-point matrix made up of logic gates that allow the switching of time slots in the spatial domain. The matrix includes a number of input horizationals and output verticals with a logic gate at each cross-point. The array permits a user of one communication device attached to one of the ports 104 to ring all communication devices on a selected port 104, ring simultaneously all communication devices connected to all of the other ports 104, ring simultaneously all communication devices connected to all of the ports 104, and ring a selected communication device on any of the ports 104. This functionality would enable the MTA to act as an intercom (within the same household) or PBX (among a plurality of interconnected households). This functionality could be further enhanced by providing unique pattern rings based on the identity of the caller or desired answering party and/or the location of the calling communication device. For example, a first household member could be identified by a ring pattern of one short and one long; a second household member by a ring pattern of two longs; and a third household member by a ring pattern of two shorts.

The MTA also provides a broad range of other functionalities. For example, the MTA would permit calls to an external network, such as the PSTN; interaction with data networks; streaming audio; and interrupts based on a predetermined event. The interrupt functionality could preempt a telephone conversation with a special display/screen (on the telephone or communication device)or audio signal notifying the parties that the predetermined event has occurred. The audio signal could be provided to the parties during a conversation and/or could be a special ring when the telephone is not in use. For example, a web browser could track an event on the Internet, such as the price of stock or commodity, and would transmit a signal to the processor to enable the display or audio signal when the price reached a certain level.

The intercom/PBX functionality could be triggered by any suitable methodology. In one configuration, the functionality is triggered by a unique key or key press sequence, such as a "*" followed by a "#". The sequence is followed by a number that is associated with a specific communication device and/or port that is to ring.

Figure 4:
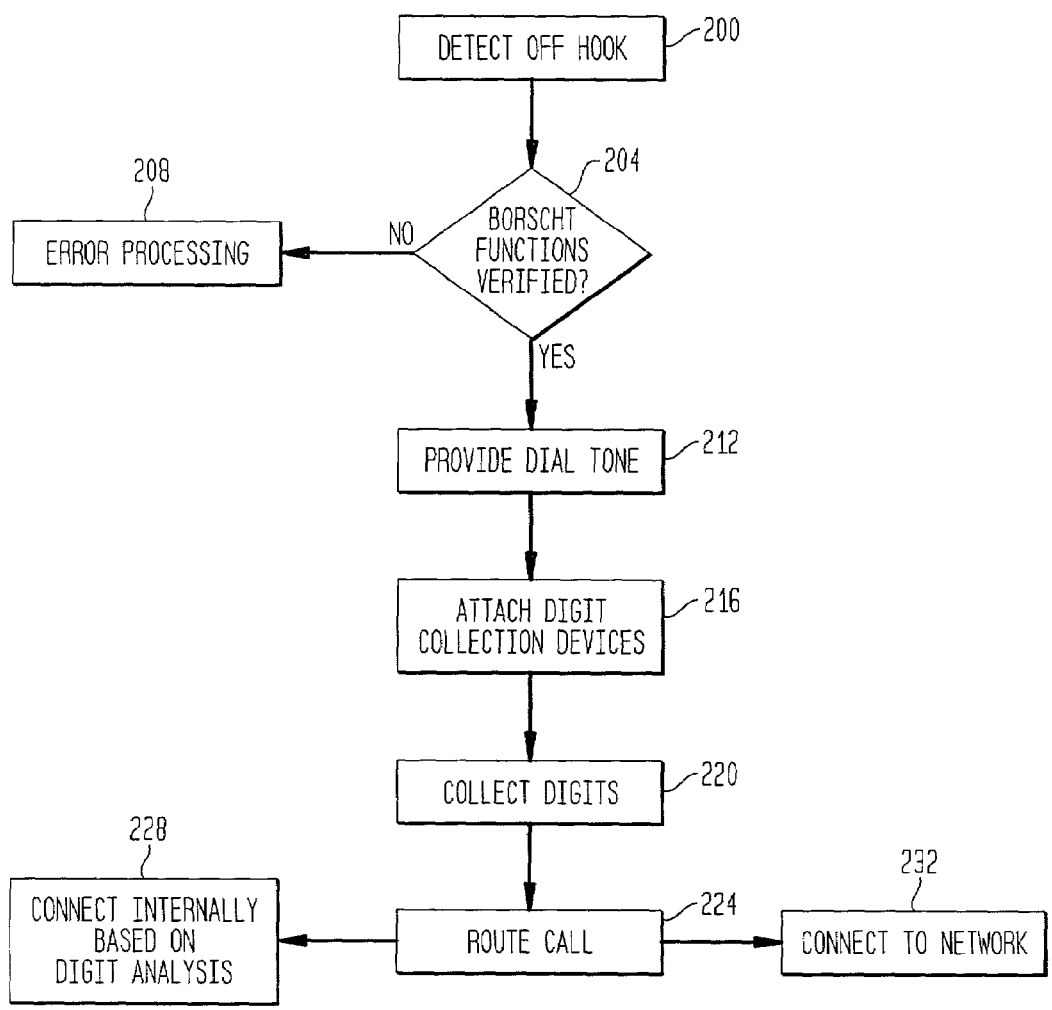
FIG. 4 depicts an embodiment of call switching software.

FIG. 4 depicts a methodology for activating the routing feature. In box 200, the processor 124 detects that a communications device has been enabled (e.g., that a telephone is off hook). This detection can be done by techniques well known in the art, such as by the receipt of a signal emitted by the communications device. In decision diamond 204, the processor 124 verifies the Borscht functions. As will be appreciated, the Borscht functions include the absence of a short, crossed lines, grounds, etc., that could damage the telephony architecture in the event that the device is connected to the PSTN. If the Borscht functions are not properly verified (e.g., a short exists), error processing is performed in box 208 by known techniques. If the Borscht functions are properly verified, the processor 124 in box 212 provides a dial tone. In box 216, the processor 124 attaches conventional digit collection devices (not shown) to the port and in box 220 collects/identifies key codes, using known techniques, based on tones received from the communications device. A look tip table is typically used for this purpose. Based on the collected key codes, the processor 124 determines in box 224 where to rout the call using routing tables. For certain collected key code(s) or sequences of key code(s), the processor 124 will in box 228 internally route the call to the correct port(s) or local communication devices. For other collected key code(s) or sequences of key code(s), the processor 124 will in box 232 externally rout the call to the pertinent network (e.g., PSTN) via the headend 10.

Figure 5:
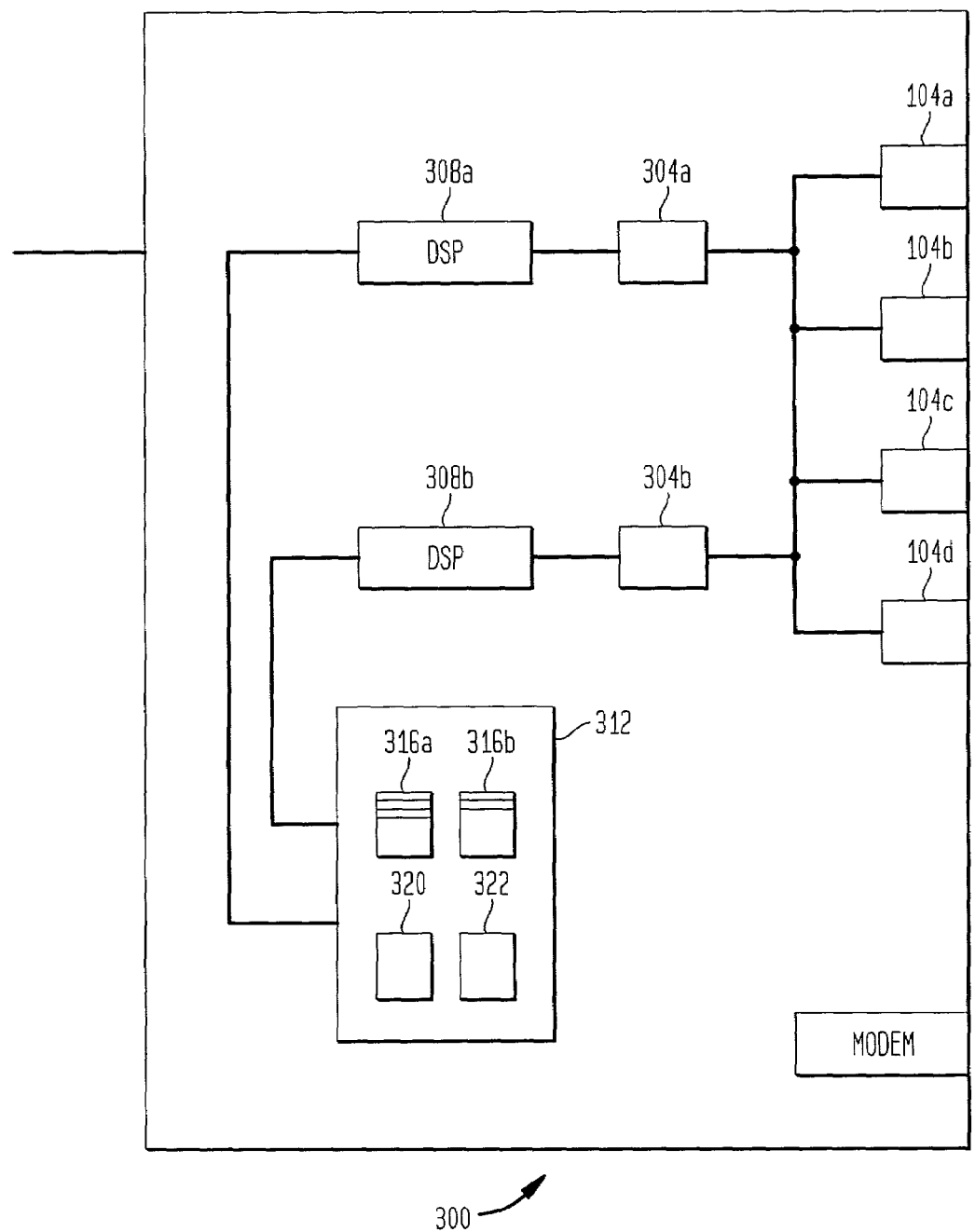
FIG. 5 depicts a second embodiment of an embedded MTA.

Referring to FIG. 5, an MTA according to another embodiment is depicted that uses logical (time) switching. The MTA 300 includes a plurality of Codecs 304a,b and digital signal processors 308a,b. The memory 312 includes, in addition to queues 316a,b, a shared portion 320 of the memory for containing call data and switch controller software 322. The port interconnect is performed by a first processor writing digital data from the first port to a time slot in the shared portion 320, and the second processor reading the written digital data from the time slot in shared portion 320 and providing it to a second port. Typical control functions of the controller 322 are time-slot "idle" or "busy". The time switch can be handled as sequential write/random read or random write/sequential read. When the second party speaks, the second processor writes digital voice data from the second party to a time slot in the shared portion, and the first processor reads the digital voice data from the time slot and provides it to the first party. In this manner, the time slots in the shared portion flip flop between containing the first and second party's voice data.

Yet another methodology is to use a common digital signal processor to write the voice data to a time slot and read the voice data from the time slot to transfer the data from one party to another party. Stated another way, the same digital signal processor would both receive and deliver the voice data. This design has the advantage that few hardware changes are required to the typical MTA as the switching feature is primarily software-driven. This and the prior embodiments, however, are disadvantaged because the delivery of voice data from one party to the other is not in real time. Accordingly, a relatively fast digital signal processor is desirable, and, the read/write process is preferably interrupt-driven.

Yet another methodology is to perform the internal routing is to use existing routers in the data network to perform the routing. For example, IP routers could be provided with telephony routing tables for directing a call from one MTA port to another port of the same MTA. This alternative, however, could be relatively complex and have quality of service issues due to the use of multiple service providers.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, the MTA can have any number of digital signal processors and/or Codecs. The MTA could have one or more digital signal processors and/or Codecs for each port. Each processor can have its own and/or a shared memory. The communications device can be devices other than telephones, such as a two-way intercom device. The MTA could be a stand alone MTA in which case the MTA would not include a modem. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A telecommunications system, comprising:
   a media terminal adaptor that includes:
      a processor;
      a plurality of parts for connecting to a plurality of communication devices;
      at least one switching device controlled by the processor, the at least one switching device connected to the plurality of ports, for connecting one port with another port, whereby a first communication device attached to a first port is connected to a second communication device attached to a second port supporting a phone conversation between two parties and at least one internet session with a web browser; and an interrupt function operative in the processor for interrupting the phone conversation of at least one of the parties based on a signal received from the web browser in response to the occurrence of a predetermined event detected by the web browser, whereby at least one of the parties is notified of the predetermined event.

2. A telecommunications system according to claim 1, wherein the media terminal adaptor is connected to a headend of a telecommunications system.

3. A telecommunications system according to claim 1, wherein the media terminal adaptor is part of a network interface unit or network interface device.

4. A telecommunications system according to claim 1, wherein the media terminal device includes a modem that is connected to a cable modem termination system.

5. A telecommunications system according to claim 1, wherein the media terminal device connects to a coaxial or fiber optic cable.

6. A telecommunications system according to claim 1, wherein the processor is a digital signal processor and the media terminal adaptor includes a second digital signal processor and a shared memory, with the digital signal processor and second digital signal processor accessing at least a portion of the shared memory.

7. A telecommunications system according to claim 1, wherein the at least one switching device is a space switch, a time switch, or combinations thereof.

8. A method for operating a media terminal adaptor, including a processor; a memory accessed by the processor; a plurality of ports for connecting to a plurality of communication devices; and at least one switching device controlled by the processor, wherein the media terminal adaptor is connected to a headend of a telecommunications system having an established internet session with a web browser, the method comprising:

receiving in the processor a first command from a user via a first communication device connected to a first port, the command requesting connection to at least a second port connected to at least one communication device, the first port and the at least a second port being in the same media terminal adaptor;

transmitting a signal to the at least a second port in response to the first command, the signal causing a communication session to be established between the user and a second user connected via the at least one communication device attached to the second port;

receiving in the processor a second command, the second command being sent from the web browser for the purposes of notifying at least one user of a predetermined event detected by the web browser; and transmitting a second signal to at least one user in response to the second command, the second signal interrupting the communication session whereby the at least one user is notified of the predetermined event.

9. A method according to claim 8, further comprising:
connecting the first port to the at least a second port when the second user enables a communication device attached to the second port.

10. A method according to claim 9, wherein the media terminal adaptor includes third and fourth ports and in the connecting step the first port is connected simultaneously to the first, second, and third ports.

11. A method according to claim 8, further comprising:
writing information received from the second port to at least a portion of the memory;
reading the written information from the at least a portion of the memory; and
providing the information to the first port.

12. A method according to claim 10, wherein the writing and reading steps are performed by different processors.

13. A method according to claim 8, wherein the media terminal adaptor is connected via a communications line to a headend and the connection of the first and second ports is independent of the communications line.

14. A method according to claim 8, wherein the media terminal adaptor includes a space switch tat is a cross-connect matrix.

15. A method according to claim 8, further comprising:
at least one of receiving and transmitting a signal over the Media Access Control and Data Link Layers.

16. A method according to claim 8, wherein in response to the signal each of the communication devices attached to the second port rings.

17. A method according to claim 8, wherein the ring has a unique pattern indicating the identity of a first user, the identity of the second user, or the location of a communications device attached to the first port.

18. A method according to claim 8, wherein the first command is a unique symbol or collection of symbols.

19. A method according to claim 8, wherein the transmitting step includes comparing at least a portion of the first command to a muting table.

20. A method according to claim 8, wherein the switching device is a router on a data network.

21. The method of claim 8 further comprising:
displaying a notification of the predetermined event on the communication device associated with the at least one user whose communication session was interrupted.

22. The method of claim 8 further comprising:
providing an audio signal during the conversation notifying the at least one user that the predetermined event has occurred.

* * * * *